United States Patent [19]
Pratt et al.

[11] Patent Number: 5,333,980
[45] Date of Patent: Aug. 2, 1994

[54] BUCKLING SEMI-SOLID RIVET

[75] Inventors: John D. Pratt, Laguna Niguel; Soheil A. Eshraghi, Irvine, both of Calif.

[73] Assignee: Textron, Inc., Providence, R.I.

[21] Appl. No.: 92,367

[22] Filed: Jul. 15, 1993

[51] Int. Cl.$^5$ .......................... F16B 13/04; F16B 19/08
[52] U.S. Cl. ...................................... 411/501; 411/34; 411/902; 470/29
[58] Field of Search ...................... 411/19, 20, 34-38, 411/43, 500-507, 901, 902; 470/28, 29

[56] References Cited

U.S. PATENT DOCUMENTS

| | | | |
|---|---|---|---|
| 2,030,167 | 2/1936 | Miller | 411/34 |
| 2,030,171 | 2/1936 | Huck | 411/34 X |
| 2,038,189 | 4/1936 | Morris | 411/34 X |
| 2,511,920 | 6/1950 | Keller et al. | |
| 2,572,246 | 10/1951 | Colley et al. | 411/34 |
| 2,842,022 | 7/1958 | Semmion | 411/20 |
| 3,426,641 | 2/1969 | Rosman | |
| 3,461,771 | 8/1969 | Briles | |
| 3,747,467 | 7/1973 | Rosman | |
| 3,848,389 | 11/1974 | Gapp et al. | 411/504 |
| 3,995,406 | 12/1976 | Rosman | |
| 4,046,053 | 9/1977 | Alvi et al. | |
| 4,126,076 | 11/1978 | Rosman | |
| 4,767,248 | 8/1988 | Pratt | 411/501 X |

FOREIGN PATENT DOCUMENTS 1154497 5/1985 U.S.S.R. ................................ 411/34

Primary Examiner—Neill R. Wilson

[57] ABSTRACT

A rivet for joining two panels together including a solid member and a member having a tubular portion surrounding part of the solid member. In one form, the rivet has a solid shank and a tail with a tubular forward portion. The shank extends entirely through an aperture in the panels to provide good shear strength. The deformable tail retains the rivet within the aperture but does not damage the edges of the aperture, which may be composite material. The tail forward tubular portion surrounds the shank and is fastened thereto mechanically or by welding. A cavity is created between the head of the tail and the rear face of the shank so that under axial compression the tubular walls of the tail buckle outward. The tail is configured to provide grip range wherein the buckling will occur against the rear wall of the workpieces being joined within a given range of workpiece thickness.

In another form, one rivet member is a sleeve with a head on one end, and the solid member has a shank that extends into the sleeve tail and has a head which engages the sleeve tail. A cavity at the end of the shank accommodates axial movement of the solid member when a portion of the sleeve buckles outwardly.

32 Claims, 7 Drawing Sheets

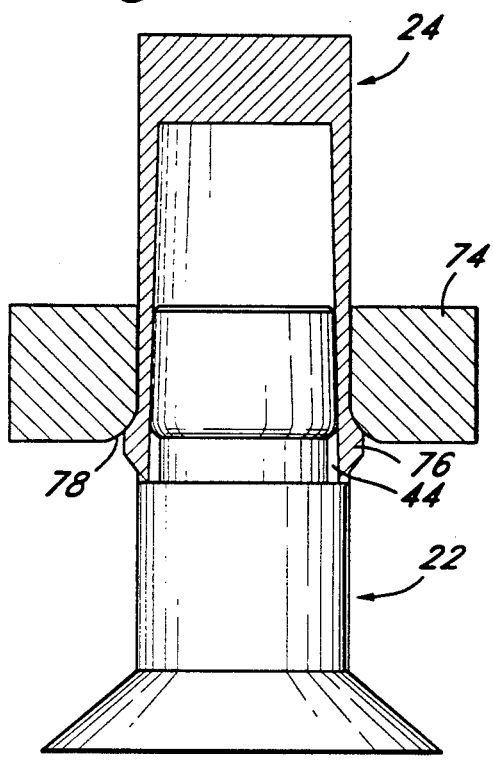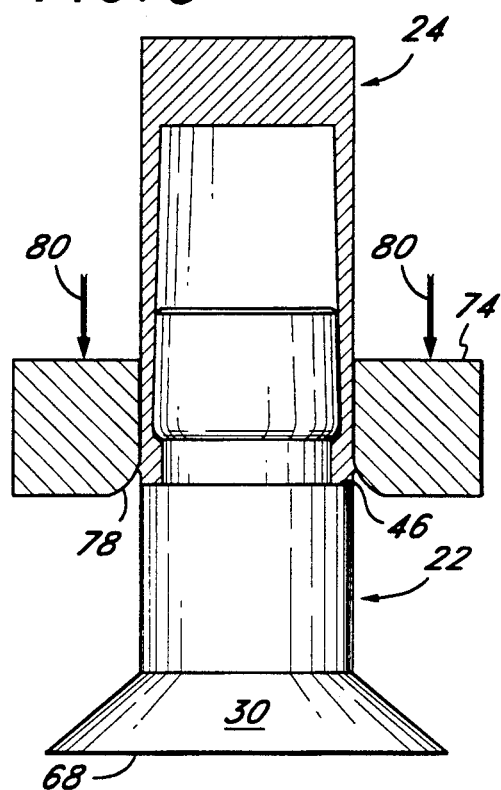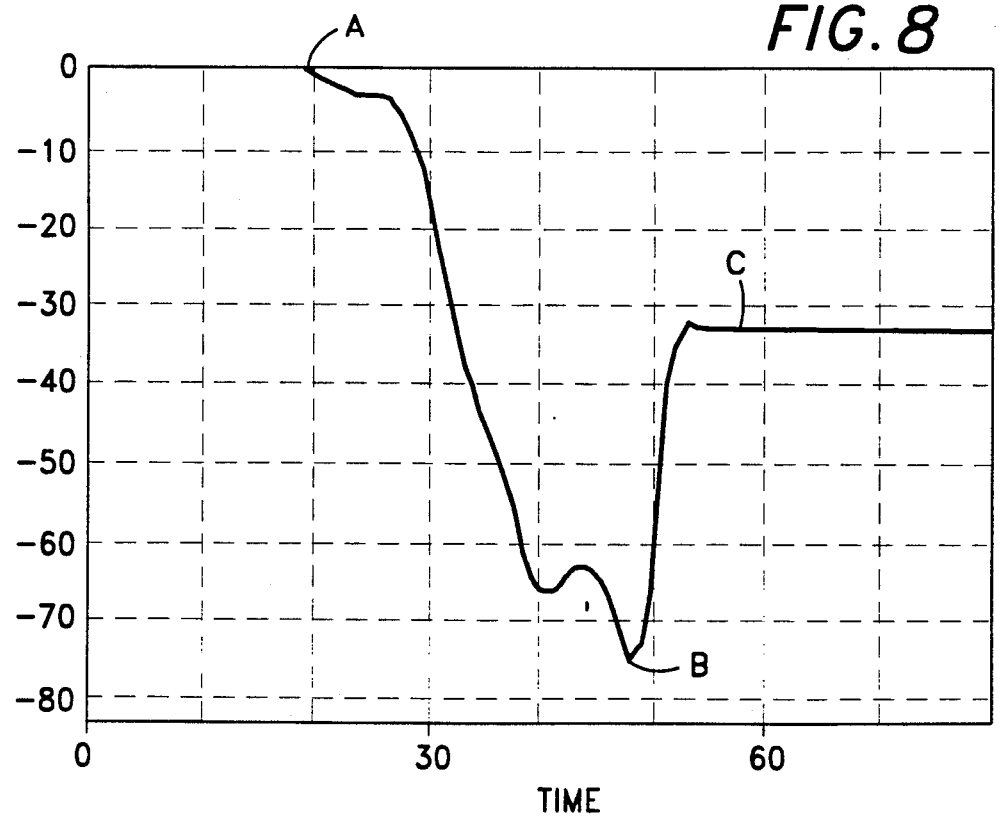

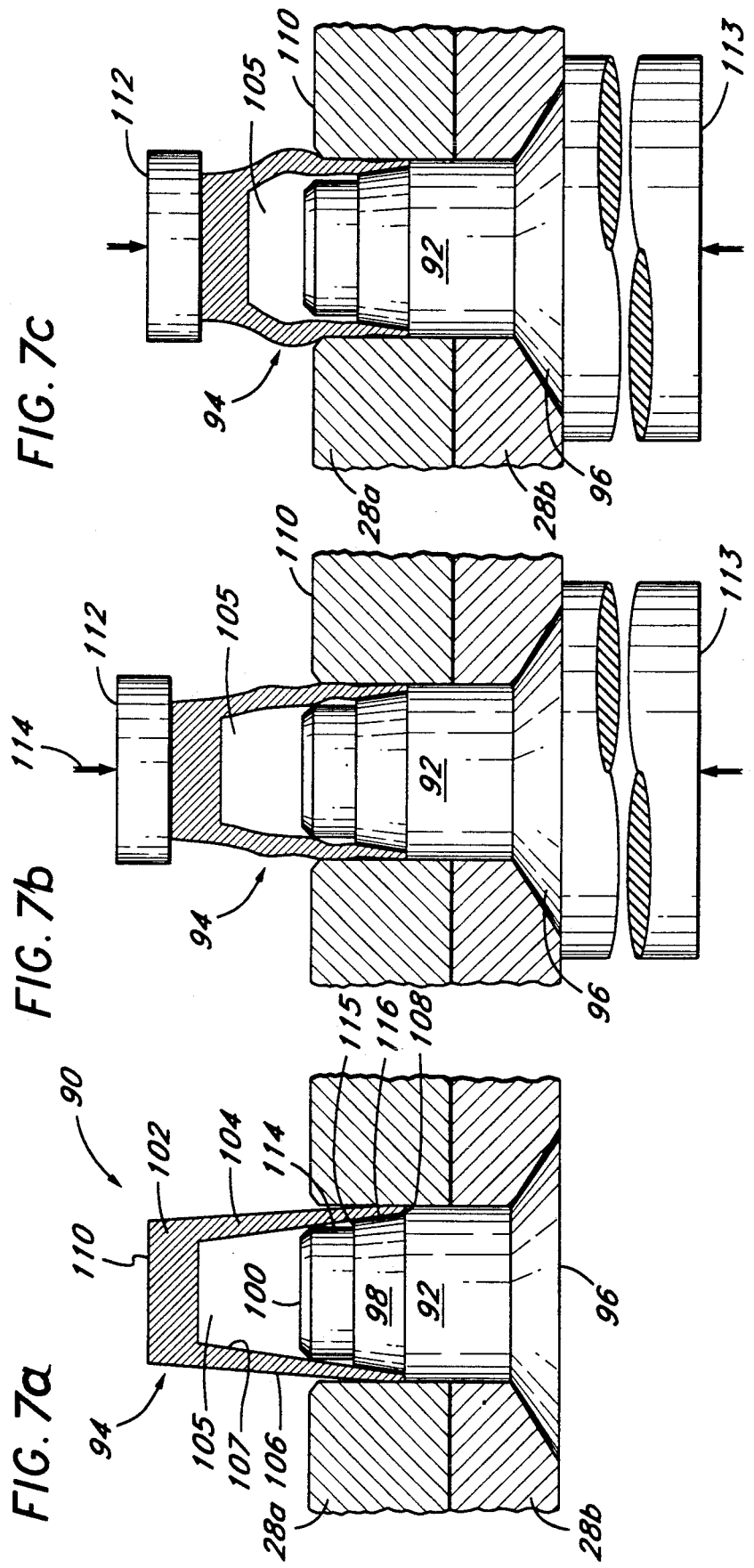

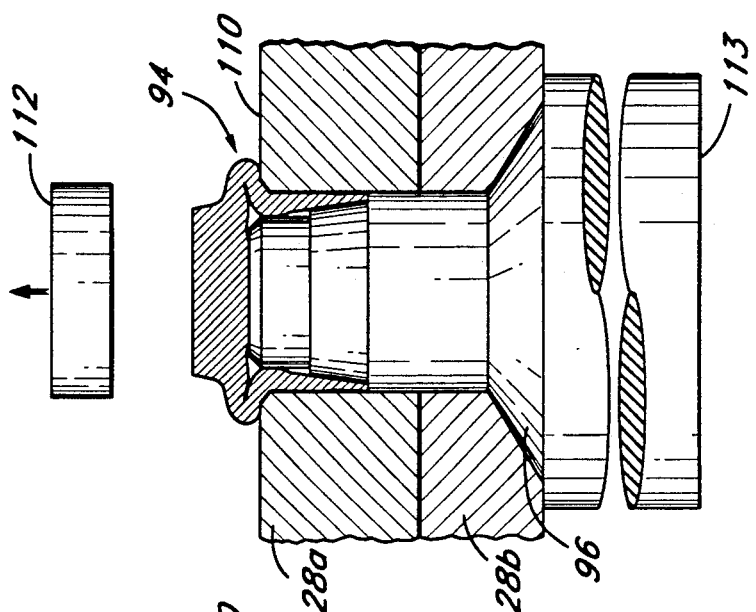
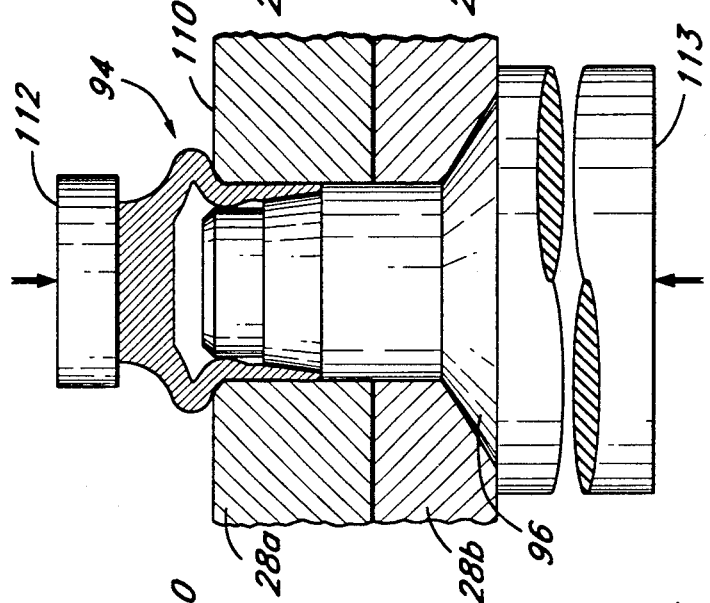
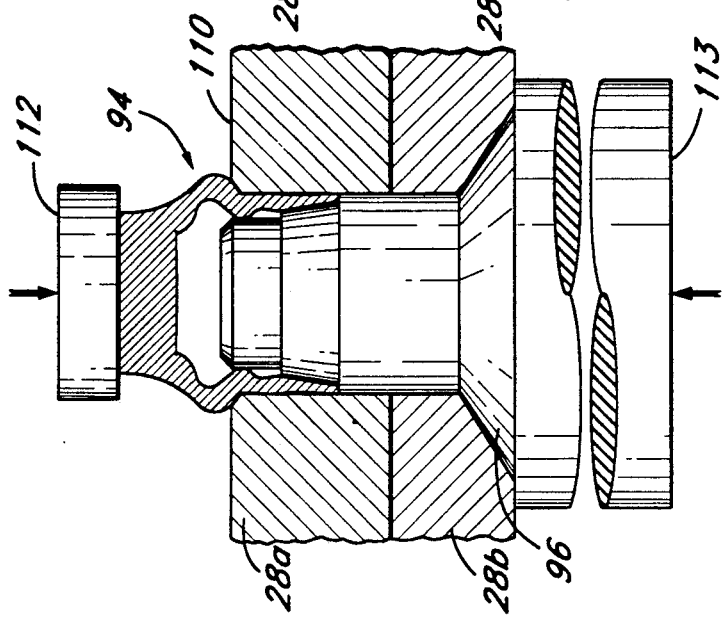

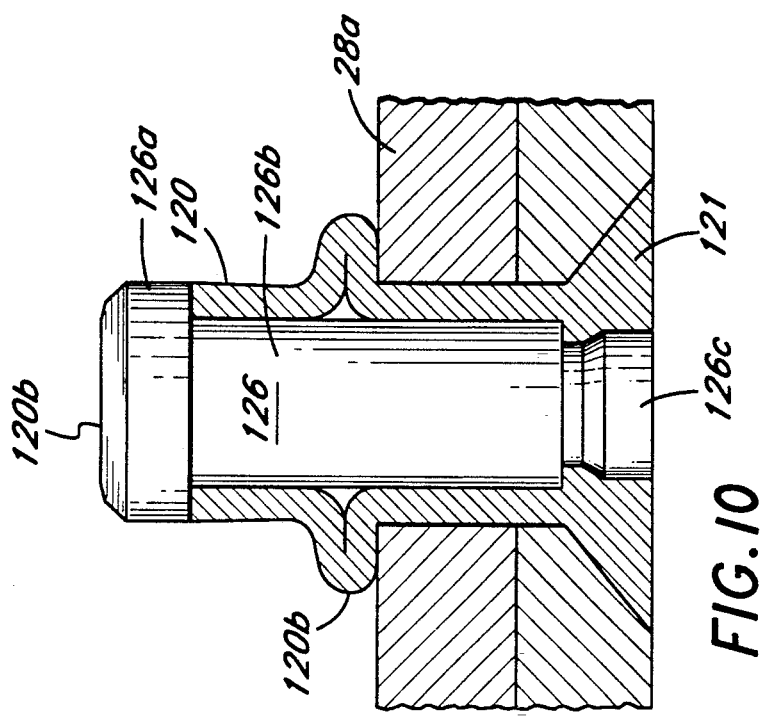
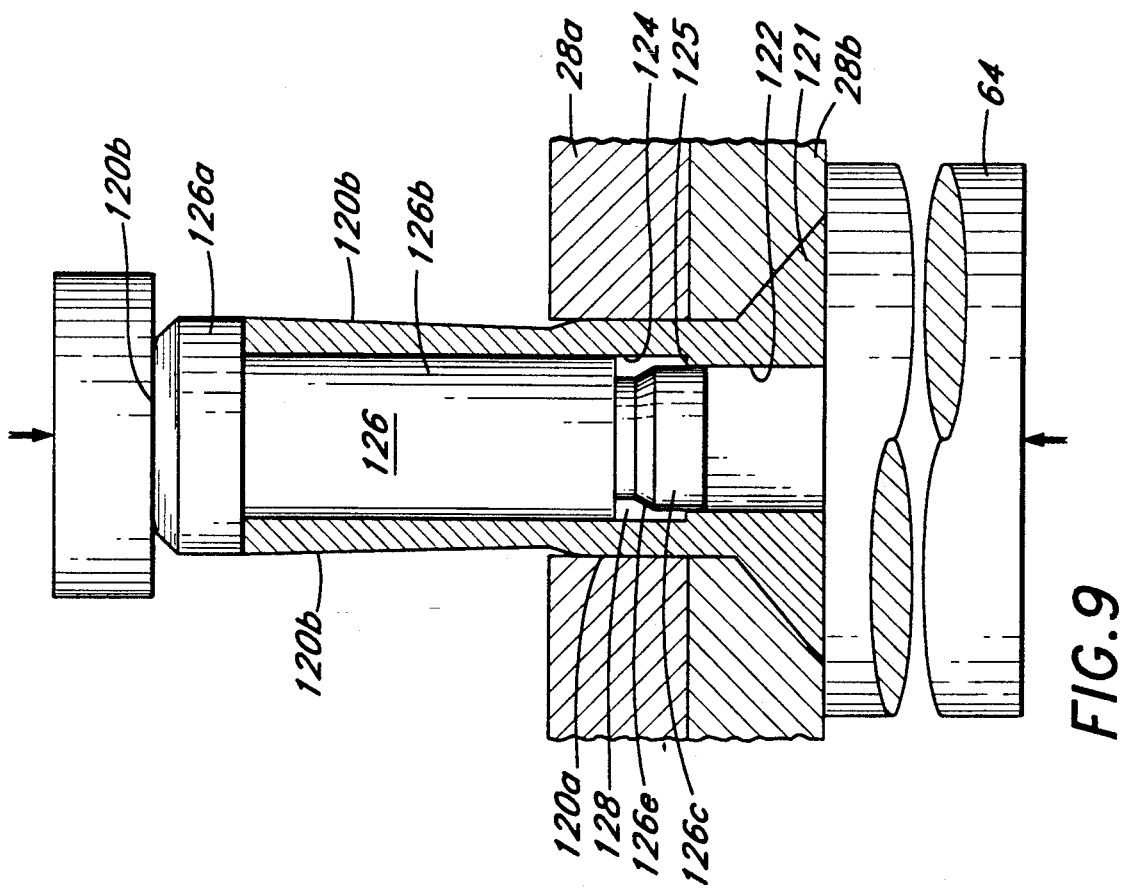

BUCKLING SEMI-SOLID RIVET

FIELD OF THE INVENTION

This invention relates to rivet-like fasteners, and particularly to rivets for joining relatively soft panels, such as those made of composite materials.

BACKGROUND OF THE INVENTION

Panels made of laminated composite materials rather than high-strength metal have many desirable characteristics, and are being used in increasing frequency for aircraft. However, high-strength solid metal rivets are not suitable for use with composite materials because forming an upset head on the tail of the rivet against a composite panel may damage the laminate. One technique for dealing with that problem is to employ tubular rivets because the tail of a tubular rivet can be bulbed or deformed more easily than the tail of a solid rivet, and thus less force is needed to upset the tail and less force is transmitted to the panel. A disadvantage of the tubular rivet is that it is generally more expensive than a solid rivet and it does not have shear strength as high as a solid rivet.

Another approach is to employ more ductile or malleable materials which will deform more readily, and hence are less likely to damage a composite panel. That approach, however, also involves a compromise with regard to shear strength, as well as the tensile strength of the deformed head needed to hold the panels together.

U.S. Pat. Nos. 3,426,641 and 3,747,467 provide systems which permit the upset forming of high strength, solid shank rivets in relatively soft aluminum sheets without adversely affecting the hole. This is accomplished by the use of a special forming collar. This collar, however, requires separate handling during installation, thereby increasing installation cost and complexity.

A further approach is the use of rivets made of high strength materials which have solid shanks and tubular ends. The ends can be upset without adversely affecting the structure in which the hole is formed, but if the tubular end is unsupported while it is being upset, internal buckling, eccentric head formation and cracking of the tubular end can result. In addition, because there is no internal support of the tubular upset end, it may not effectively resist the relatively high tensile separation loads on the joint.

U.S. Pat. No. 4,126,076 to Rosman discloses a fastener having a solid shank with a tubular tail, and a core pin positioned in the tubular tail to prevent inward deformation of the tail. This adds to the expense of the fastener, as well as introducing the need to retain the core pin within the rivet, both before and after installation. Also, if it is desired to use a particularly hard material, even deforming a tubular tail has its limitations in terms of ease of deformation against a soft panel. To prevent cracking of the upset tail, the Rosman patent finds it necessary that only tubular upsettable material extend beyond the face of the workpiece. That is, the solid shank end does not extend beyond the workpiece.

Because of varying design or tolerance thicknesses of panels being joined, it is usually desirable that a particular fastener be designed so that it has a grip range which will satisfactorily accommodate such variations. If the fastener does not have a satisfactory grip range, its application may be greatly limited. Various techniques have been employed for causing fasteners to buckle or deform in a desired manner or location consistent with the grip range. U.S. Pat. No. 2,030,167—Miller, for example, discloses varying the wall thickness of a buckling sleeve to affect the location of the buckle.

A need exists for a rivet having the shear strength of a solid rivet and a tail which can be readily upset so as to be usable with softer workpieces. Further, such a fastener must accommodate a reasonable workpiece thickness range. It is, of course, necessary that the rivet be highly reliable and economical to fabricate and install.

SUMMARY OF THE INVENTION

Briefly stated, the rivet of the invention is formed of two members, one of which is solid and the other which has a tubular portion which surrounds a portion of the solid member. When installed through aligned holes in a pair of panels, a head end of the rivet engages the exterior of one of the panels, with a tail end of the rivet protruding beyond the outer face of the other panel. The tubular portion includes a section that intersects and protrudes beyond the outer surface of the second panel. An internal cavity is formed in the rivet that allows that section to bulge or buckle outwardly away from the solid member and create a deformed head against the exterior face of the second panel. The two piece rivet thus has high shear strength, but yet the deformed head buckles readily to not damage the adjacent panel.

In one form of the invention, the solid member has a manufactured head on one end and has a body which is adapted to extend completely through the panels and protrude partially beyond the exterior face of the second panel. The second member is primarily a tail component in this form of the invention. The forward portion of this tail member is tubular and surrounds a reduced diameter portion of the solid member. The forward end of the forward portion is adapted to extend into the second panel member where it is secured to the solid member so that together they form the rivet shank. The rear of the tail member is solid, being completely closed on its axial end face. The cavity which permits buckling of the tubular portion is formed between the axial end of the solid member and an interior wall of the tail member, and is circumferentially surrounded by a rear part of the tubular portion. Advantageously, the buckling of the tubular portion is limited by an inner wall of the tail member engaging the axial end of the solid member as the cavity axial length is reduced to zero.

The forward end of the tail may be secured to the rear of the shank in various ways. In a preferred approach, an annular groove is formed in the shank at a location spaced forwardly from the rear of the shank, and the tail is provided with a thickened section on its forward end which is deformed inwardly into the shank groove in an assembly process to mechanically lock the two components. As an alternative approach, the forward end of the tail may be welded to the shank, preferably by spin welding techniques.

The walls of the buckling portion are constructed such that the buckle will be formed consistently against the rear face of a workpiece for a given grip range. In a preferred form of the fastener, this is accomplished by tapering the wall thickness of the buckling portion so that it is thinnest in the direction of the forward end of the shank. The outer wall of the buckling portion may be a constant diameter or may be tapered with its largest diameter at the shank end. In yet another approach, the wall of the buckling portion can be heat treated to cause it to buckle first in that area, so long as it is not supported on its exterior by the workpiece.

In a second form of the invention, the member having the tubular buckling portion is completely tubular in the form of a sleeve. The sleeve extends completely through the panels being joined, with a head on one end engaging the outer face of one of the panels and a tail on the other end which protrudes beyond the exterior face of the other panel. The solid member has an enlarged head on a tail end that engages the axial end of the sleeve, the exterior diameter of the head on the solid member being substantially the same as the exterior diameter of the sleeve tail such that the two members together form the rivet shank exterior. The solid member further includes a reduced diameter shank which extends into the sleeve and through most of the axial length of the sleeve. However, the forward end of that reduced diameter portion terminates spaced from the axial face of the head end of the sleeve so that an internal cavity is formed in the head end of the rivet bounded by the axial forward face of the solid member and a surrounding manufactured head on the sleeve.

When an axial compressive force is applied to the ends of the rivet, the solid member is pushed forwardly, causing the portion of the sleeve which protrudes beyond the second panel, thus being unsupported on its exterior, to buckle outwardly, creating a deformed head against the outer face of the second panel. The buckling portion preferably has a tapered wall thickness so that it will always buckle against the panel for a range of panel thicknesses. The forward face of the solid member engages the tool applying the compressive force to limit the forward movement of the solid member, to ensure a flush head end face, and limit the buckling of the sleeve buckling portion. The solid member includes an internal shoulder that engages a shoulder on the sleeve to deform sleeve shoulder material into a lock groove in the solid member, to thus axially lock the two components.

With the fastener of the present invention, the tail may be readily buckled or deformed in a controlled manner at the desired location without damaging a panel made of composite material or other relatively soft material. A major advantage of this is that the tail may be fabricated from a material different from the shank so as to provide the desired result for the joint created. Of course, the tail may be made of the same material as the shank, if desired. Further, while the cost of the fastener is naturally greater than a simple solid rivet, the fastener is sufficiently economical to provide a preferable alternative in many situations.

BRIEF DESCRIPTION OF THE DRAWINGS

FIG. 5 is a cross-sectional view of the fastener of FIG. 1 prior to assembly;

FIG. 6 is a cross-sectional view of the fastener of FIG. 1 during an assembly process;

FIG. 7a-f are cross-sectional views showing an alternative embodiment of the fastener and the steps of installation in order to join two panels.

FIG. 8 is a graph showing the compressive load at the panel interface before during and after installation of the fastener of the present invention.

FIG. 9 is a cross-sectional view of an alternative form of the invention, showing the rivet with its two-part construction before it has been set.

FIG. 10 is a cross-sectional view showing the rivet of FIG. 9 after it has been set.

DESCRIPTION OF THE PREFERRED EMBODIMENTS

Figure 1:
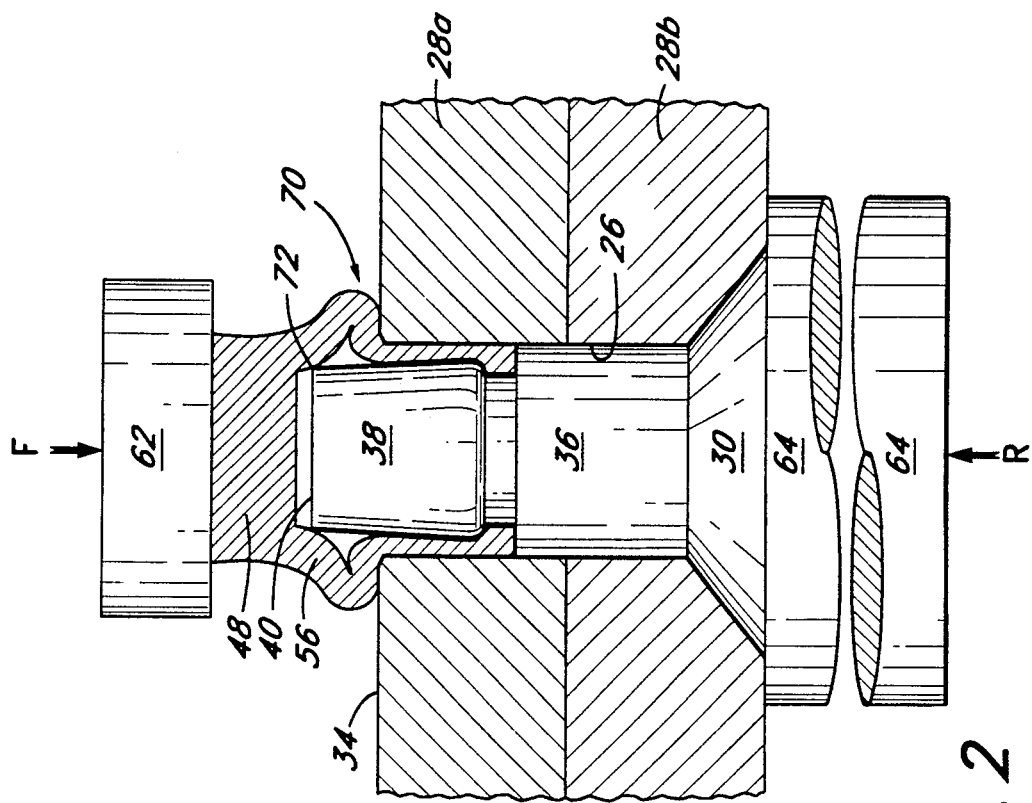
FIG. 1 is a cross-sectional view of a preferred fastener of the present invention shown prior to being deformed to join two panels.

Referring to FIG. 1, a semi-solid rivet or fastener 20 of the present invention is shown comprising a solid rivet body 22 and a tail 24 extending through aligned apertures 26 in two workpieces such as inner and outer panels 28a and 28b. The rivet body 22 comprises an elongated, solid shank 36 having a tail end portion 38 and a manufactured head 30 on its forward or head end, the head being positioned in a counter-sunk recess 32 in the panel 28b. The end portion 38 is preferably slightly radially outwardly tapered from an end face 40 to an annular groove 44 midway along the length of the shank 36. An annular shoulder 46 steps the diameter of the shank 22 from the annular groove 44 to the major diameter portion of the shank 36.

The tail 24 comprises a solid rear end 48 and a forwardly extending tubular portion 50. The tubular portion 50 includes a forward end 52 having an inwardly extending annular locking rib or flange 54 which fits within the annular groove 44 of the shank 36. The portion of the tail between its flange 54 and the end of the shank closely surrounds the shank but is not attached to the shank except by the rib and groove connection. The length of the tubular wall 56 of the tail 24 is such that a cavity 58 is formed between the rear end face 40 of the shank and an inner face 60 of the tail end 48. A buckling portion of the wall extends from the inner face 60 to the rear face of the panel 28a. The wall 56 has a substantially constant exterior diameter but an inner diameter which gradually reduces from the forward end 52 to the inner face 60. Thus, the wall thickness of the tubular portion tapers from its thickest at the inner face 60 to its thinnest adjacent the rib 50. As seen, the overlapping portion of the tail and shank create a cylindrical exterior.

The fastener 20 is shown in FIG. 1 prior to an installation procedure to join the panels 28a,b. The installation process involves upsetting the tail 24 to form a head against the rear face 34 of the panel 28a. The rivet body 22 is made of a material having the desired shear strength to handle the loads introduced at the interface of the panels 28a,b. Desirably, the solid major diameter portion of the shank 36 spans the interface and provides shear strength of the material of the solid rivet body 22. The tail 24, on the other hand, is preferably constructed of a suitable material which will readily deform yet still provide a sufficient tensile strength to hold the fastener in place once installed. Thus, the fastener 20 when joining two panels combines the shear strength of the solid body 22 with an enhanced tensile strength as compared to prior non-damaging rivets provided by the unique tail 24 design, as will be explained further below.

The rivet body 22 is constructed of a material with shear properties that exceed the bearing strength of the panels 28. The material may be a composite, metal or other similar expedient. The tail 24 is preferably a softer material than the rivet body 22, yet may be identical. In one embodiment, the tail 24 is manufactured from a commercial grade titanium.

Figure 2:
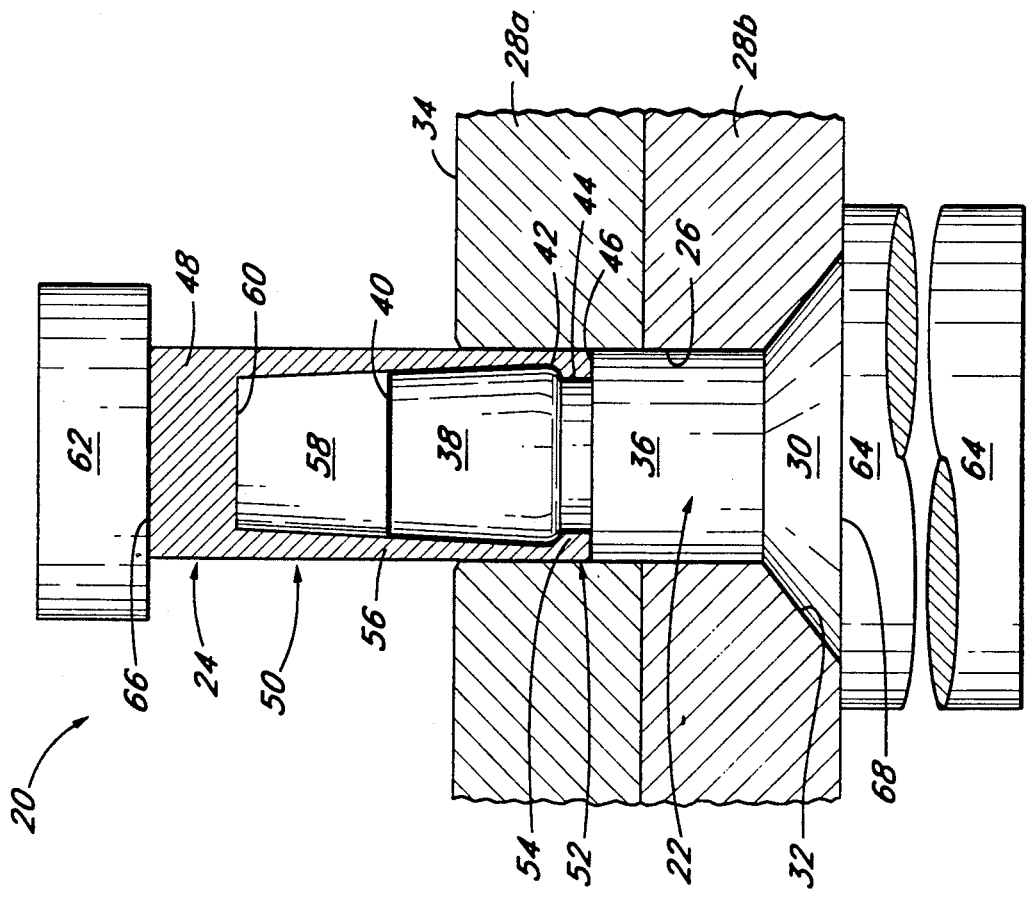
FIG. 2 is a cross-sectional view of the fastener of FIG. 1 during an installation procedure to join the two panels.

In setting the fasteners, an axial compressive force, as denoted by force arrows F and R in FIG. 2, is applied to the fastener by a compression tool 62 and an anvil 64. Compression of the fastener causes the tubular wall 56 of the tail 24 to buckle at a region 70 against the rear wall 34 of the inner panel 28a. The buckling in the region 70 occurs radially outward due to the absence of support on the exterior of the wall 56. As shown in FIGS. 1 and 2, the connection between the shank and the tail is surrounded by the panel 24a, and a short length of the end portion 38 of the shank extends rearward from the panel rear face 34 to help prevent the wall 56 from buckling inwardly at that location. The shank end portion 38 is preferably chamfered at 72 to assist in the spreading of the tubular wall 56 as the inner wall 60 continues forward towards the end face 40. Due to the preferred taper of the wall 56, the point with the least column strength to resist the forces of compression is located at the intersection of the workpiece rear wall 34 and the tail wall 56.

Figure 3:
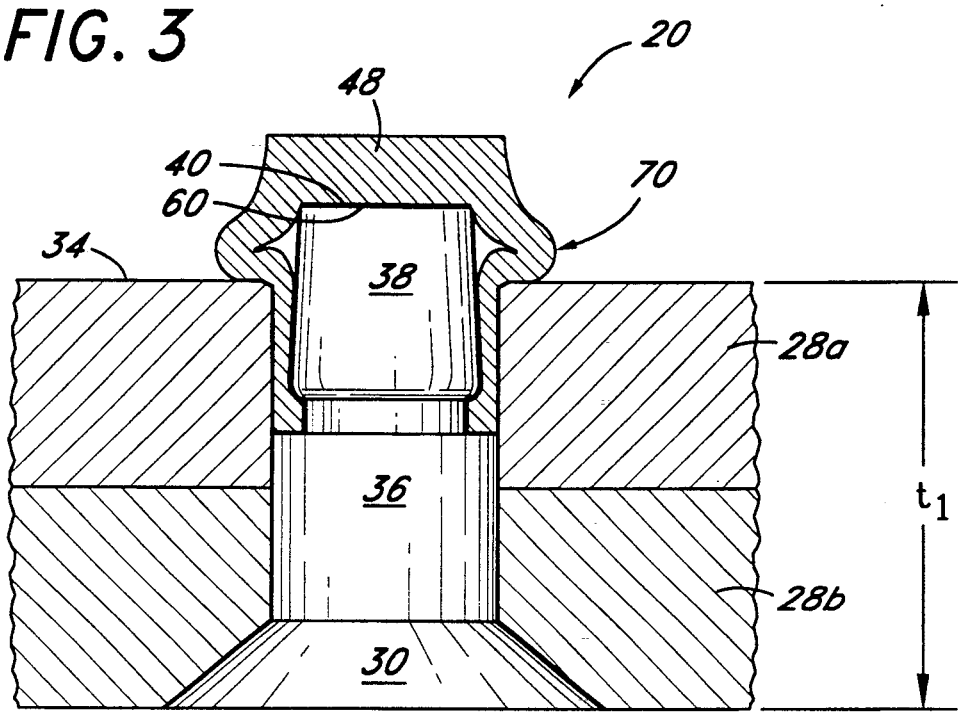
FIG. 3 is a cross-sectional view showing the fastener of FIG. 1 joining two relatively thick panels.
Figure 4:
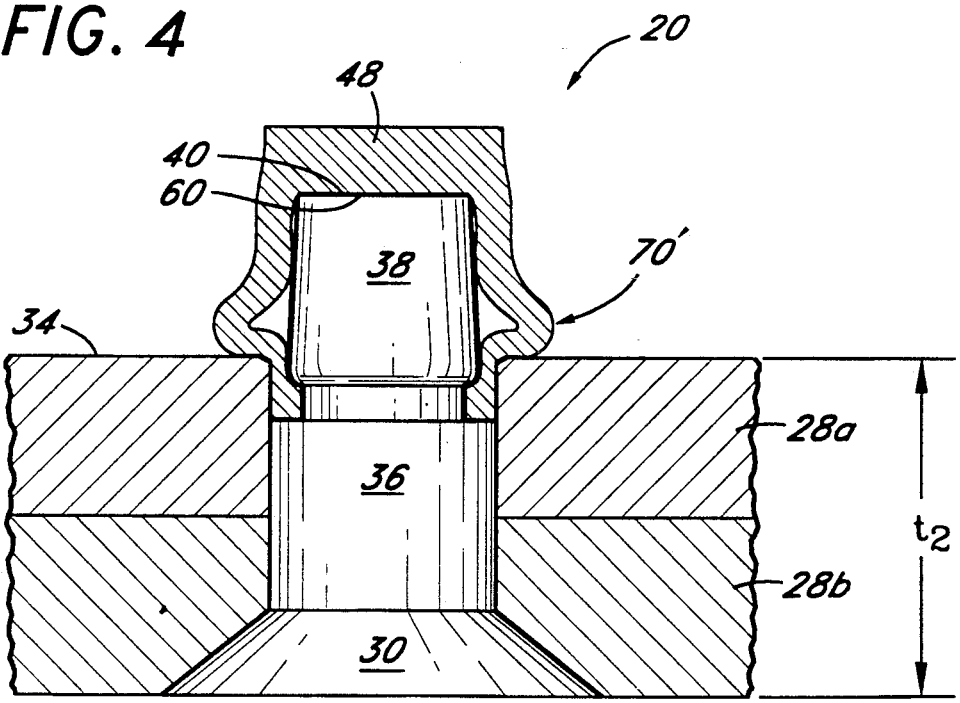
FIG. 4 is a cross-sectional view of the fastener of FIG. 1 joining two panels of lesser thickness than those of FIG. 3.

FIGS. 3 and 4 show the installed fastener 20 after the inner face 60 of the tail head 48 has come into contact with the end face 40 of the rivet 22, thus limiting the amount of buckling. The two configurations shown in FIGS. 3 and 4 illustrate an advantageous feature of the fastener 20 of the present invention which provides a certain "grip range" in order to fasten different thicknesses of panels together. Specifically, the two panels 28a and 28b of FIG. 3 have a combined thickness of $t_1$. In contrast, the workpieces 28a and 28b in FIG. 4 have a combined thickness of $t_2$, which is substantially less than the thickness $t_1$ shown in FIG. 3. The buckling region 70 in FIG. 3 is located farther rearward, and closer to the tail head 48, than the buckling region 70' in FIG. 4. The buckling region thus is dependent upon the location of the rear wall 34 of the inner panel 28a, and the buckled tail portion is always against the rear wall 64 to provide good clamping.

Although the fastener 20 of FIGS. 1-4 shows a tapered wall 56 of the tail 24 to provide a weak region for buckling at the rear wall 34 of the panel 28a, other techniques may be used to provide this function. For example, the present tail may be formed of one material yet have a portion of the tubular wall 56 heat treated to render it easier to deform than the rest of the tail. Such heat treatment would be applied in a region which insures a sufficient grip range, as described for the views of FIGS. 3 and 4. In one embodiment, this would be the region adjacent the wall 34 for the minimum and maximum panel thicknesses.

FIGS. 5 and 6 show intermediate steps in a preferred assembly process to join the tail 24 and rivet shank 36 prior to installation across two panels. The forward end of the tail is initially formed with an outwardly extending, annular flange 76. The inner wall is straight yet tapered to closely fit over shank 36. An annular forming die 74 (shown in two parts in cross-section) fits over the tail 24 and engages the flange 76. The die 74 includes an arcuate forming surface 78 to facilitate the smooth deformation of the flange 76 into the groove 44. As shown in FIG. 6, the die is forced downwardly over the flange 76 to deform the material into the shape of the groove 44 creating the flange 54 of FIG. 1.

In FIG. 7a, an alternative fastener 90 is shown having a rivet body 92 and a tail 94. The rivet body 92 again comprises a head 96 and a shank 98, the shank having reduced diameter steps terminating in a rear end face 100. The tail 94 is substantially similar to the tail of FIG. 1 and generally comprises a solid rear end 102 and a forward tubular wall portion 104. The solid rear end 102 is initially spaced from the rear end portion 100 of the shank creating, as before, a cavity 105 which provides clearance for the tail 94 to be compressed toward the body 92.

One important difference from the embodiment of FIG. 1 is that an outer surface 106 of the wall 104 tapers from a large diameter at a forward end 108 to a smaller diameter at the rear face 110 of the rear end 102. The inner surface 107 of the wall 104 has its largest diameter proximate the forward end 108 and reduces toward the solid rear end 102 at a greater rate than does the outer surface 106, resulting in a tapered thickness of the tubular wall, as in the previous embodiment. The inner surface 107 toward the forward end 108 lies flush with a tapered region 116 of the shank 98. The tapered region 116 terminates in a step 115 which reduces the shank 98 to a constant diameter cylindrical region 114 adjacent the rear face 100.

The components of the fastener 90 are assembled prior to installation in the workpieces by a technique known as "spin welding". This technique involves spinning one of the components relative to the other to generate frictional heat at their interface to a degree which creates a bond sufficient to hold the components together during shipping and installation. In this embodiment, the bond is created at the interface between the inner surface 107 and the tapered region 116 of the shank. Of course, other methods of joining the components of the fastener 90 together in a nonmechanical bond are possible, such as epoxy or other types of welding. The tapered outer surface 106 facilitates insertion of the tail portion 94 into, and subsequent removal from, a spin welding element, yet other means of holding the tail are possible.

FIGS. 7b through 7f show the steps of deforming the tail 94 into the finished fastener. As with the embodiment of FIG. 1, an axial compressive force is applied to the fastener 90 by a tool 112 and an anvil 113 to cause the walls of the tubular portion 104 to buckle outward and engage the rear wall 110 of the inner panel 28a.

Initially, as in FIG. 7b, the tubular wall 104 begins to buckle outward in the region just rearward of the rear face. Due to the taper of the tubular wall 104, the force transmits through the wall causing a combined axial compressive force and bending moment to be applied that bows the wall outward rather than inward. Furthermore, the provision of the step 115 and cylindrical region 114 limits the bonding interface between shank 98 and tail 94 to a location spaced from the rear wall 110, and allows a portion of the tubular wall 104 surrounding, yet not connected to the shank, 98 to deform outward. This is particularly important as the combined panel thickness decreases and the cylindrical region 114 extends beyond the rear wall 110. As seen in FIG. 7b, the initial compressive force causes a portion of the tubular wall 104 surrounding the cylindrical region 114 to bow outward until restricted by the through-hole in the workpiece 28a.

FIGS. 7c through 7e show the progression as the tail 94 is deformed further until the final shape of FIG. 7f, at which point the tool 112 is removed and the fastener 90 is completed.

FIG. 8 shows a graph of the compressive load measured at the interface between two panels during installation of the fastener 90. It is seen that the compressive load (conventionally given in negative values) is initially zero at point A and increases to a maximum value at point B, when the solid rear end 102 of the tail contacts the rear surface of the rivet body 92. At this point, the axial compression from the tools is relieved, but a certain residual compression exists as at C, thus providing a tight joint.

The present fastener provides for an improvement in the tensile properties of the joint as compared with non-damaging fasteners of the prior art. The beneficial inclusion of a solid tail head 48,102 generates a more desirable bulbing of the tubular tail which occurs directly against the rear face of the panels in a non-symmetric fashion providing good clamp-up, as seen best in FIGS. 2-4. Furthermore, the solid form of the tail end couples the circumferential buckled region across the fastener to reinforce this region against tensile stresses applied from the panel rear face. Moreover, the residual compression created by the preferred fastener and shown in FIG. 8 increases the tensile strength of the joint.

The provision of a solid end of the tail which bottoms out on the rear face of the shank facilitates assembly with various tools. Typically, a single application of hydraulic or pneumatic force is applied to press the parts together forming the tail head. The contact between the solid tail end and shank limits the deformation of the tubular wall thus preventing possible shear rupture. Alternatively, an oscillating pneumatic hammer-like tool may be used to gradually form the tail with repeated blows, which are received by a bucking bar held against the opposite end of the fastener. This type of forming tool emits substantial vibratory energy which can de-laminate composite materials if propagated therein. Fortunately, the present solid tail end bottoms out on the shank, thus transmitting the majority of vibrations through the rivet body to the backing tool or anvil, not to the surrounding workpiece panels. Furthermore, the pitch of sound generated by such a tool changes when the tail bottoms out on the shank, thus positively alerting the operator that the fastener is installed.

EMBODIMENT OF FIGURES 9-12

Referring to FIG. 9, there is illustrated a tubular member or sleeve 120 having a head 121 on one end. A cylindrical interior bore has a smaller diameter head end portion 122 and a larger diameter tail portion 124. A shoulder 125 is created at the intersection of the two portions. The axial length of the smaller diameter portion is somewhat greater in length than the axial length of the frustoconical head 121. A section 120a of the sleeve adjacent the head 121 has substantially a cylindrical exterior. A section 120b of the sleeve adjacent section 120a has a reduced diameter that tapers outwardly to a full diameter at the sleeve end equal to that of the section 120a diameter. Thus, the thickness of the side wall of the section 120b tapers from a thinner portion adjacent the sleeve section 120a to a thicker wall at the tail end of the sleeve.

The second part of the fastener of FIG. 9 is a solid member 126 having a rear head 126a with a cylindrical exterior having a diameter substantially equal to the adjacent end of the sleeve 120. A forward annular face of the head 126a thus engages the annular end of the sleeve 120. The axial outer end face 120b of the solid member is flat and closed.

The solid member 126 further includes a cylindrical shank 126b adjacent the head 126a which is positioned within the sleeve 120, being substantially surrounded by the sleeve section 120b. The forward end of the solid member 126 includes a cylindrical section 120c which fits within the sleeve forward cylindrical section 122. The forward face of the section 120c is spaced rearwardly from the outer face of the sleeve head. Thus, the forward face of the section 126c forms a rear wall of a cavity 130 which is surrounded by the head 121 and the sleeve section 120a.

The solid member forward section 126c and the larger diameter portion 126b are joined by a reduced diameter neck 126d and a tapered, frustoconical portion 126e. This creates an annular groove 128 bounded by the radially exterior surfaces of the sections 126d, 126e and 126c. The cavity 136 is further bounded on its radially outer side by the interior, cylindrical wall of the sleeve section 120a. The head end of the cavity 136 is bounded by the shoulder 125, and the rear wall of the cavity is formed by an annular shoulder 127 extending between the sections 126b and the neck 126d.

As may be seen, the axial length of the sleeve 120 is selected so that the sleeve extends completely through the two panels to be joined, and protrudes beyond them. The sleeve tapered section 120b intersects the outer face of the upper panel.

Referring to FIG. 10, when the rivet is to be set, an axial compressive force is applied to the ends of the rivet in a manner similar to that outlined in connection with the arrangements of FIGS. 1-7. This causes the sleeve section 120b protruding beyond the upper panel to buckle outwardly to create a deformed head against the outer face of the upper panel. The sleeve buckles outwardly because the solid member within the sleeve prevents it from buckling inwardly. The portion of the sleeve extending through the workpiece cannot buckle outwardly since it is confined by the workpiece. Thus, it is only the unsupported part of the sleeve which can buckle outwardly. The taper on the sleeve wall is arranged such that the thinnest unsupported wall section is always adjacent the outer surface of the upper panel 28a. Thus, the buckling commences in that area, which ensures a tight joint between the two panels, minimum thickness panels being shown in the drawings. As pointed out in connection with the previously described embodiments, a residual compression between the two panels remains when the compressive force on the fastener is removed.

Note from FIG. 9 that the dimension between the two shoulders 125 and 127 is shorter than the axial dimension of the cavity 130. Thus, these shoulders will interfere and resist the compressive action on the rivet. However, the shoulder 125 is dimensioned, and the sleeve and solid member materials are selected such that the shoulder 127 will displace a portion of the sleeve shoulder 125. This displaced material is moved into the unfilled portion of the annular groove 128 immediately surrounding the neck 126d to lock the member 126 to the sleeve. The axial movement of the member 126 is limited by the engagement of the forward axial face of the solid shank section 126c with the tool 64 being used to apply the axial compression. This arrangement thus limits the buckling of the shank and assures that the end face of the member 126 is flush with the rivet head 121.

Figure 11:
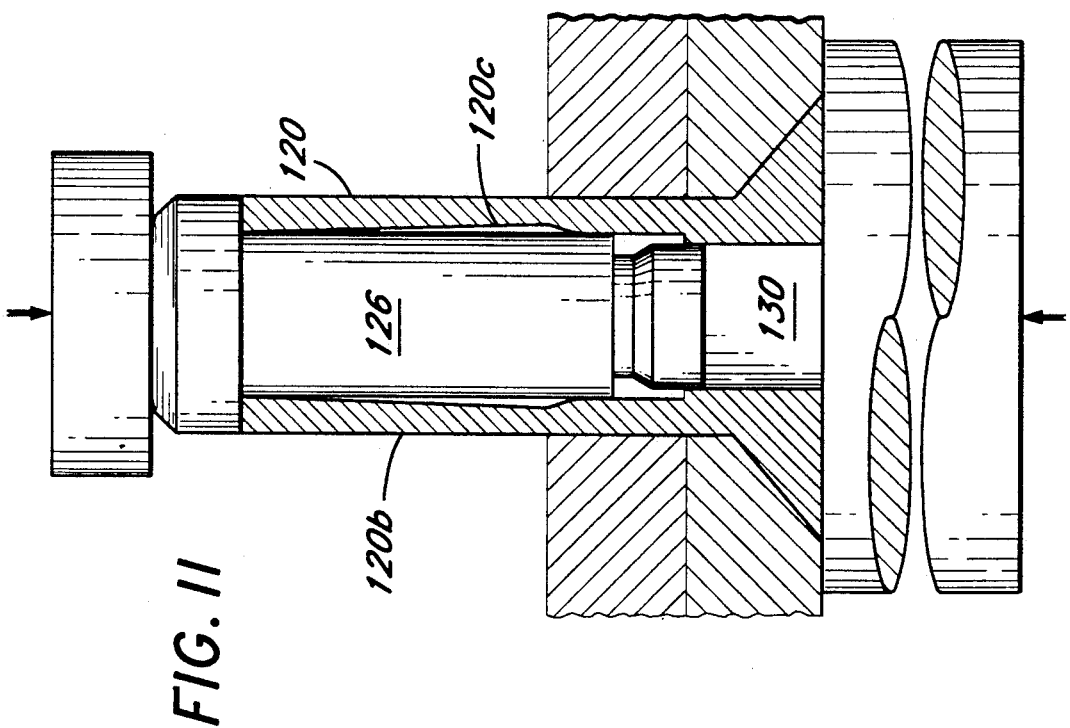
FIG. 11 is a cross-sectional view of a rivet similar to FIG. 9, but with a sleeve having an internally tapered buckling portion.

FIG. 11 shows a fastener identical to that in FIG. 9 except that the exterior of the sleeve buckling portion is cylindrical while its interior wall 120c is tapered from the sleeve tail to a layer interior diameter on the portion of the sleeve which intersects with the outer face of the panel. This results in the portion of the sleeve which is unsupported on its exterior being the thinnest at the intersection with the panel for a given combined thickness range of the two panels. The result is essentially the same as that described in connection with the arrangement of FIG. 1.

Figure 12:
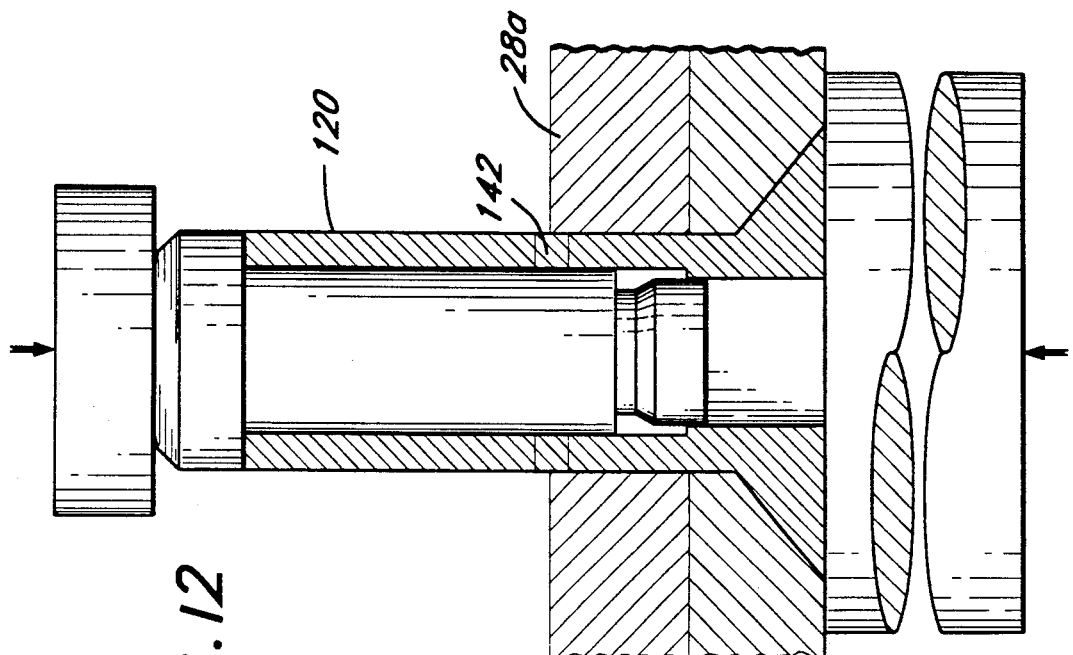
FIG. 12 is a cross-sectional view of a rivet similar to FIG. 9, but with an annealed buckling portion.

FIG. 12 shows a fastener similar to that in FIGS. 9 and 11 except that the sleeve shank is cylindrical on its exterior and its interior. To ensure the commencement of buckling of the sleeve at the intersection of the sleeve with the outer panel 28a, an annular band 142 of the sleeve has been annealed so as to be more readily deformable than the adjacent portions of the sleeve. The band annealing technique is of course applicable to the forms of the invention illustrated in FIGS. 1–7.

From the foregoing, it can be seen that the embodiments of FIGS. 9–12 share common advantages of the embodiments of FIGS. 1–7. That is, the tubular buckling portions of the rivets provide easier deformation against the panels than solid rivets. Hence this is advantageous for softer workpieces. The rivets provide internal support to prevent internal buckling and provide buckling portion wall constructions that ensure good clamp up against the workpieces and provide residual compressive forces on the panels. Further, the fasteners provide a positive limit of the buckling; and in the case of the sleeve design, ensure a solid shank flush with the sleeve head.

Although this invention has been described in terms of certain preferred embodiments, other embodiments that are apparent to those of ordinary skill in the art are also within the scope of this invention.

It is claimed:

1. A rivet for joining panels, comprising:
a two-piece shank formed of a substantially nontubular solid member and a member having a tubular portion surrounding a portion of said solid member, said tubular portion having an exterior forming a part of a cylindrical shank exterior, and said solid member having an exterior forming a part of the exterior of said shank adjacent said tubular portion exterior; and
a head forming a part of one of said members on one end of said rivet, and a rivet tail on the opposite end forming a part of the other of said members, each of said members being shorter than said rivet before setting of the rivet, said solid member being longer than the combined thickness of said panels, said members defining an interior cavity axially adjacent an end of said solid member, the cavity being surrounded radially by a part of said tubular portion, said tubular portion including a section which is deformable to buckle radially outwardly when unsupported outwardly and subjected to a compressive force on opposite ends of said rivet, said cavity being adapted to accommodate shortening of said rivet caused by said force and the buckling of the tubular section, and said members having interior, axially facing surfaces that engage after the axial dimension of the cavity has reduced a predetermined amount.

2. A rivet for joining panels, comprising:
a two-piece shank formed of a solid member and a member having a tubular portion surrounding a portion of said solid member, said tubular portion having an exterior forming a part of a shank exterior, and said solid member having an exterior forming a part of the exterior of said shank adjacent said tubular portion exterior; and
a head forming a part of said solid member on one end of said rivet, and a rivet tail on the opposite end forming a part of the other of said members, each of said members being shorter than said rivet before setting of the rivet, said solid member being longer than the combined thickness of said panels, said members defining an interior cavity axially adjacent an end of said solid member, the cavity being surrounded radially by a part of said tubular portion, said tubular portion including a section which is deformable to buckle radially outwardly when unsupported outwardly and subjected to a compressive force on opposite ends of said rivet, said cavity being adapted to accommodate shortening of said rivet caused by said force and the buckling of the tubular section, and said members having interior, axially facing surfaces that engage after the axial dimension of the cavity has reduced a predetermined amount.

3. The rivet of claim 2, wherein said cavity is positioned between an axial end face of said solid member and an inner wall of the member having said tubular portion.

4. A rivet for joining panels, comprising:
a two-piece shank formed of a solid member and a member having a tubular portion surrounding a portion of said solid member, said tubular portion having an exterior forming a part of a shank exterior, and said solid member having an exterior forming a part of the exterior of said shank adjacent said tubular portion exterior; and
a head forming a part of the member having said tubular portion on one end of said rivet, and a rivet tail on the opposite end formed integral with said solid member, each of said members being shorter than said rivet before setting of the rivet, said solid member being longer than the combined thickness of said panels, said members defining an interior cavity axially adjacent an end of said solid member, the cavity being surrounded radially by a part of said tubular portion, said tubular portion including a section which is deformable to buckle radially outwardly when unsupported outwardly and subjected to a compressive force on opposite ends of said rivet, said cavity being adapted to accommodate shortening of said rivet caused by said force and the buckling of the tubular section, and said members having interior, axially facing surfaces that engage after the axial dimension of the cavity has reduced a predetermined amount.

5. The rivet of claim 4, wherein said cavity is formed within said head adjacent an end of said solid member.

6. A two-part rivet body, including a tubular sleeve having a head on one end and a tubular tail on the other end, and a solid member having a shank extending through said tubular tail and into said sleeve, terminating at a point spaced from an outer axial face of said head to define a cavity, said solid member further having an enlarged head on the tail of said shank that engages the tail end of said sleeve, a portion of said sleeve which normally protrudes beyond the end of a workpiece when the rivet is positioned within the workpiece being adapted to buckle or deform outwardly when an axial compressive force is applied to the opposite ends of said rivet, said cavity being adapted to accommodate the buckling of said sleeve.

7. The rivet of claim 6, wherein said sleeve buckling portion has a wall thickness which tapers from a smaller diameter area which is normally positioned within the workpiece to a larger diameter area which normally protrudes beyond the workpiece, whereby the thinnest wall thickness of said sleeve which is radially unsupported is normally positioned adjacent the workpiece in the area in which said sleeve protrudes beyond the workpiece.

8. The rivet of claim 6, wherein said sleeve has an inner cylindrical wall which has a reduced diameter adjacent the head end of the sleeve, creating a rearwardly facing shoulder, said solid member having a generally cylindrical exterior with a reduced diameter portion near its forward end creating a forwardly facing shoulder on said solid member, said shoulders being adapted to interfere, an annular groove being formed in said solid member adjacent said solid member shoulder so that as said rivet is compressed when said shoulders are interfering, sleeve material is displaced into said groove so as to lock the solid member axially within the sleeve, said shoulders being located so as to interfere before the forward end of said solid member can engage a compression tool pressing against said head during a rivet setting operation.

9. A semi-solid rivet for joining panels, comprising:
a shank to extend through said panels having a head end engaging one of said panels and a tail end protruding beyond the outer face of a second one of said panels, said shank being formed by a non-tubular solid member having a section with an exterior surface forming a part of the exterior surface of said shank, and a member having a tubular portion which surrounds a portion of said solid member and has an exterior surface which forms a portion of the exterior surface of said shank, a section of said tubular portion surrounding said solid member intersecting and protruding beyond the outer face of said second panel, said tubular portion section being adapted to buckle outwardly when an axial compressive force is applied to the ends of said rivet, said rivet having an internal cavity formed by said members which accommodates the shortening of said fastener which occurs when said force is applied to the rivet, said buckling portion being configured such that the forward boundary of the buckling will always occur at the intersection of the buckling portion and the outer face of said second panel, within a predetermined rivet grip range.

10. The rivet of claim 9, wherein said solid member includes an annular groove for receiving material from said tubular member to lock said members together.

11. A semi-solid rivet, comprising:
a solid shank to extend through a workpiece having a head end and a rear end; and
a tail having a forward portion secured to said shank, said tail further having a rear portion spaced axially rearwardly from the shank, said tail further having a buckling portion positioned between said tail forward and rear portions, said buckling portion defining a cavity within said tail adjacent the shank rear end which will permit said tail rear portion to be compressed towards said shank and cause said buckling portion to buckle outwardly adjacent a rear surface of said workpiece when an axial compressive force is applied to a head end of said shank and the rear portion of said tail, said buckling portion being configured such that the forward boundary of the buckling will always occur at the intersection of the buckling portion and the rear face of the workpiece, within a predetermined rivet grip range.

12. The rivet of claim 11, wherein the radial thickness of the buckling portion tapers from a thinner forward boundary to a thicker rear boundary so that the thickness adjacent the rear face of the workpiece is always thinner than the part of the buckling portion extending rearwardly from the workpiece.

13. The rivet of claim 12, wherein the exterior of said buckling portion is cylindrical.

14. The rivet of claim 11, wherein the buckling portion is tubular with a wall thickness that tapers from a thin forward end to a rear end adjoining the tail rear end.

15. The rivet of claim 11, wherein said shank rear end has a diameter smaller than that of a forward end of the shank, and said shank has an annular groove with a diameter smaller than that of the shank rear end, said groove being located intermediate the shank ends, said tail forward end having a radially inwardly extending annular flange which is deformed into said shank groove to mechanically connect said tail to said shank.

16. The rivet of claim 11, wherein the connection between said tail and said shank is at a location forwardly spaced from the rear face of the workpiece.

17. The rivet of claim 11, wherein the connection between said tail and said shank includes an interengaging groove and flange.

18. The rivet of claim 11, wherein the forward end of said tail is welded to said shank.

19. The rivet of claim 11, wherein said tail forward portion is tubular and the tail rear portion has a closed axial end face.

20. The rivet of claim 11, wherein the maximum buckling of said tail buckling portion is limited by an axial inner wall of said cavity engaging the tail end of said shank.

21. The rivet of claim 11, wherein the connection between the tail and the shank is spaced forwardly from an end face of said shank such that a forward part of said tail buckling portion surrounds said shank and can buckle outwardly from the shank.

22. A rivet, comprising:
an elongated body having a solid, closed head end, a solid, closed tail end and a generally cylindrical exterior, said body further having an interior cavity creating a tubular buckling portion adjacent said tail end, said buckling portion being formed to buckle outwardly when a predetermined axial compression force is applied to said body, said body tail end being formed as an integral one piece tail with said buckling portion, said body having axially facing surfaces that engage to limit buckling of said buckling portion.

23. A rivet, comprising:

an elongated body having a head end, a solid, closed tail end, and a generally cylindrical exterior, said body further having an interior cavity creating a tubular buckling portion adjacent said tail end, said buckling portion being formed to buckle outwardly when a predetermined axial compression force is applied to said body, said body closed end being formed as an integral one-piece tail with said buckling portion, the wall thickness of said tubular buckling portion tapers from a thinner forward end to a thicker rearward end so that the forward boundary of the buckling will occur at the forward most area of the buckling portion that is unsupported on its radial exterior when the compressive force is applied.

24. The rivet of claim 22, wherein said body includes a shank having a rear portion positioned within a forward part of said buckling portion which is free to buckle outwardly from said shank rear portion.

25. A rivet comprising:

a solid shank having a head end and a rear end;

a tail having a tubular forward portion and a solid rear portion, said forward portion having an open end surrounding said shank rear end, said tail having been formed as a separate element and then secured to said shank, the tail having an inner wall formed by said solid rear portion which is spaced from said shank tail end so that a cavity is formed by said inner wall, an end face of said shank rear end and said tail tubular portion.

26. The rivet of claim 25, wherein said shank tail end has a cross section smaller than that part of the shank extending forwardly from said tail.

27. The rivet of claim 25, wherein said shank tail end combined with the part of each tail surrounding the shank create a cylindrical shape extending to a head on the head end of the shank.

28. A method of making a semi-solid rivet, comprising the steps of:

forming a solid rivet shank;

forming a rivet tail having a tubular forward portion; and securing said tubular forward portion to a rear portion of said shank so that a part of said tail tubular portion extends rearwardly from an axial end face of said shank rear portion and forms an interior cavity between said end face and said tail which will enable the portion of said tail surrounding said cavity to buckle outwardly when a compressive force is applied to the rivet.

29. The method of claim 28, wherein said securing includes welding the forward end of said tail to said shank.

30. The method of claim 28, wherein said securing includes:

forming an annular groove in said shank at a location spaced forwardly from an end face of the rear of said shank;

forming an annular flange on the forward end of said tail tubular portion; and deforming said flange into said groove to mechanically connect the tail and the shank.

31. The method of claim 28, including forming said tail tubular portion in a manner such that the forward boundary of the buckling of the tail will occur at the intersection between the buckling portion and the rear face of a workpiece through which the rivet is installed, over a predetermined range of workpiece thickness.

32. The method of claim 28, wherein said securing step includes securing said tubular forward portion to said shank at a location spaced forwardly from an end face of said shank so that a portion of the tail surrounding the shank is free to buckle outwardly when said force is applied.

* * * * *